Jan. 30, 1945.  G. A. LYON  2,368,239
WHEEL COVER STRUCTURE
Filed July 2, 1942   2 Sheets-Sheet 1
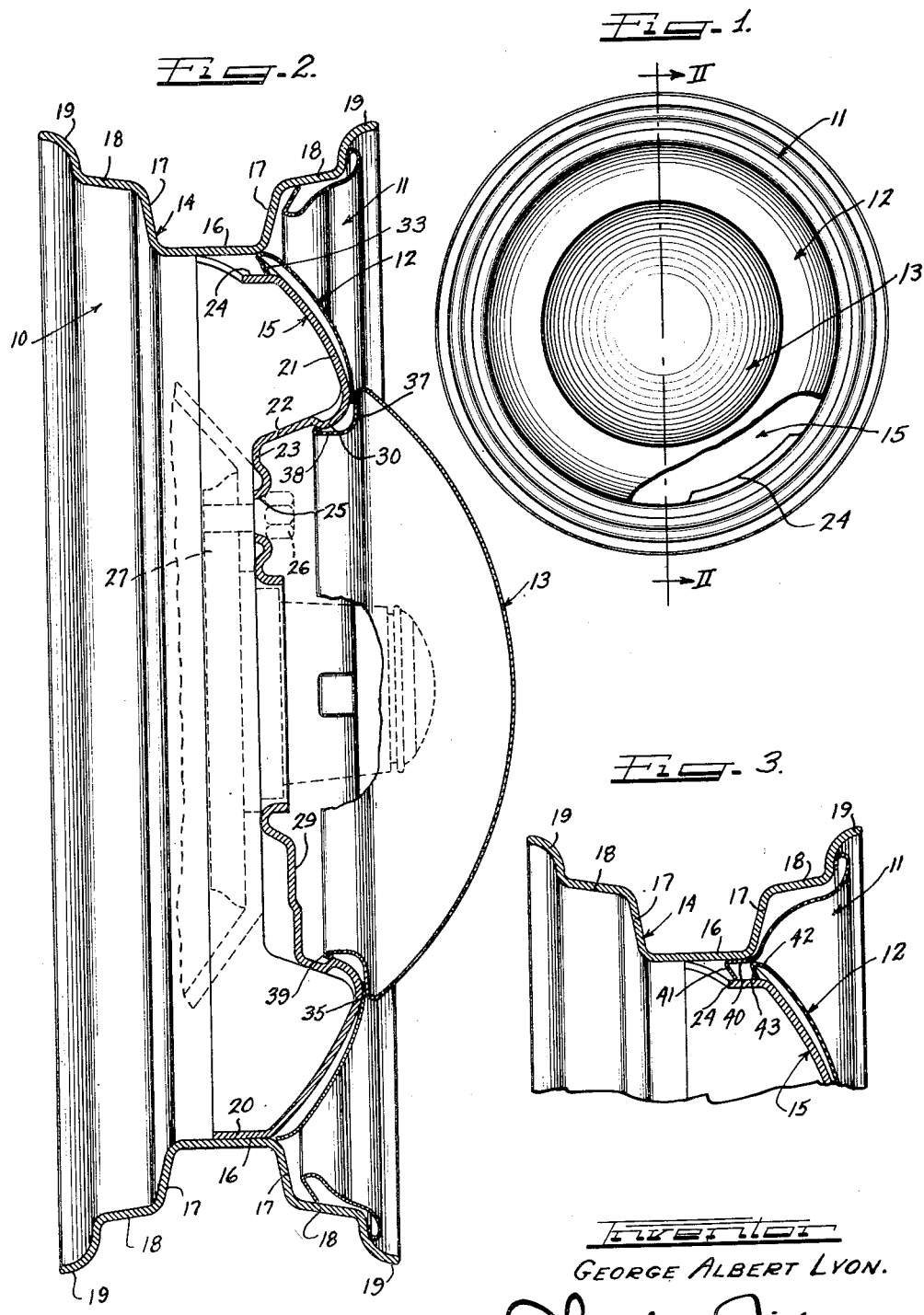
Inventor
GEORGE ALBERT LYON.

Jan. 30, 1945.　　　G. A. LYON　　　2,368,239
WHEEL COVER STRUCTURE
Filed July 2, 1942　　　2 Sheets-Sheet 2
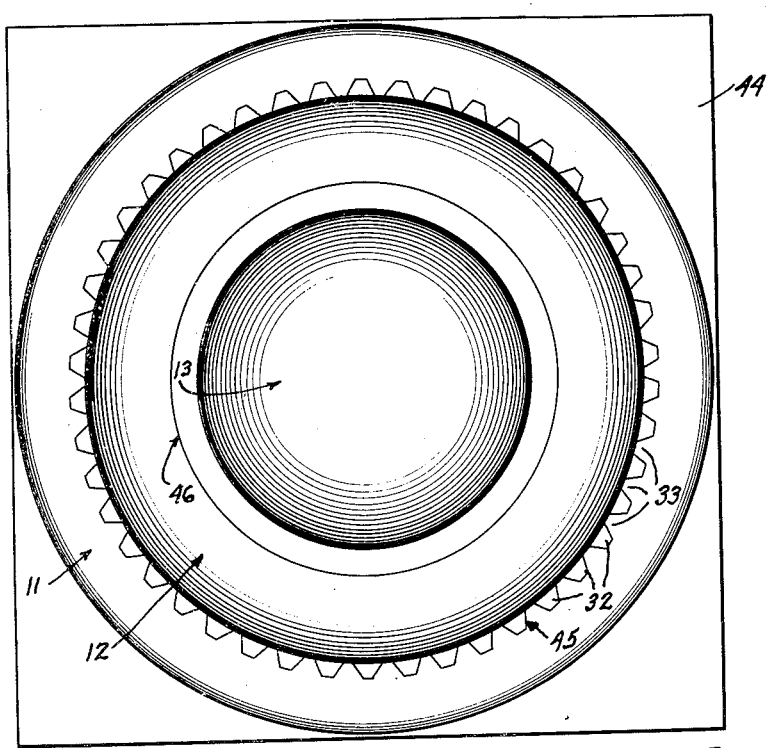
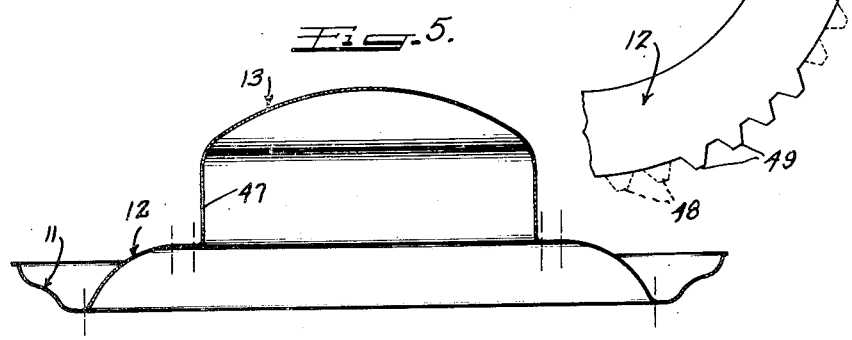
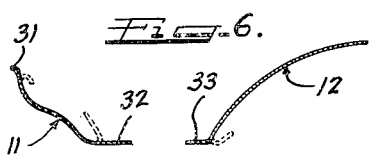
Inventor
GEORGE ALBERT LYON.

Patented Jan. 30, 1945

2,368,239

UNITED STATES PATENT OFFICE 2,368,239

WHEEL COVER STRUCTURE

George Albert Lyon, Allenhurst, N. J.

Original application October 6, 1939, Serial No. 298,220. Divided and this application July 2, 1942, Serial No. 449,397

5 Claims. (Cl. 301—37)

This invention relates to wheel cover members and to a novel wheel assembly. This application is a division of my copending application Serial No. 298,220, filed October 6, 1939, entitled "Method of making wheel cover members."

It is an object of the present invention to provide a novel wheel assembly including a wheel and one or more cover members of novel design.

Another object of the present invention is to provide a novel wheel assembly, the component parts of which are economical to manufacture and rugged and reliable in use.

Another and still further object of the present invention is to provide a novel mounting for wheel cover members on a vehicle wheel.

The novel features which I believe to be characteristic of the present invention are set forth with particularity in the appended claims. My invention itself, however, both as to its organization, manner of construction, and method of manufacture and assembly, together with further objects and advantages thereof, may best be understood by reference to the following description, taken in connection with the accompanying drawings, in which:

Figure 1 is a front view of a vehicle wheel equipped with a set of ornamental members constructed and mounted on the wheel in accordance with the teachings of the present invention, a portion of the cover members being broken away to show the design of the front face of the wheel;

Figure 2 is an enlarged cross-sectional elevational view taken along the line II—II of Figure 1;

Figure 3 is a fragmentary cross-sectional view view of the upper portion of a wheel illustrating a different embodiment of the present invention; and Figures 4, 5, 6 and 7, illustrate a novel method of manufacturing the wheel cover members which are shown mounted on the vehicle wheel in Figure 2.

Referring first to Figures 1 and 2 of the drawings, there is illustrated therein a wheel assembly comprising a vehicle wheel 10 and three cover members 11, 12 and 13. The wheel 10 comprises a rim part 14 and a body part 15. The rim 14 is of the usual drop center type and includes a base flange 16, opposite intermediate side flanges 17, opposite intermediate base flanges 18, and opposite edge portions 19. The drop center rim 14 as illustrated is of the type which is commonly employed in the automotive vehicle art of the present day, and, as is well known to those skilled in the art, is arranged to receive and accommodate a pneumatic tire (not shown).

The body part 15 of the wheel 10 includes, in general, a rearwardly extending outer flange 20 an outer web portion 21 a generally axially rearwardly and slightly radially inwardly extending flange or shoulder 22, and a radially inwardly extending wheel mounting flange 23. The rearwardly extending outer flange 20 is secured to the under side of the base flange 16 of the rim 14 in any suitable manner, such as by riveting, welding or the like. Circumferentially spaced portions of the rearwardly extending outer flange 20 are depressed radially inwardly as at 24.

The wheel mounting flange 23 is provided with an annular series of apertures 25 for the reception of the usual wheel mounting bolts 26 which extend therethrough into engagement with the wheel supporting axle element 27 and the brake drum 28. Circumferentially spaced portions of the wheel mounting flange 22 are pressed axially outwardly as at 29 to increase the strength of the wheel mounting flange in a manner well known to those skilled in the art.

An annular series of radially inwardly projecting protuberances 30 are in close proximity of this shoulder flange portion 22 with the web 21.

The cover members 11, 12 and 13 are formed of relatively thin metals and each has its outer surface provided with an ornamental finish, such, for example, as having its surface highly polished, chromium plated, or enameled. I have found that a very satisfactory form of material for the cover members, and particularly for the cover member 13 is a stainless steel having approximately 18 per cent chromium and 8 per cent nickel therein. By employing cover members of very thin strong metal stock, it will be observed that these cover members do not add materially to the unsprung weight of the wheel.

The cover member 11 is illustrated as being in the form of a trim ring having an inturned radially outer edge 31 which is arranged to be seated on and bear against the outer edge portion 19 of the rim 14, and the radial inner edge 32 is serrated (as is shown in Figure 4 and bent obliquely radially outwardly and axially forwardly into biting engagement with the intermediate base flange 18 of the rim 14.

The cover member 12 is shaped to cover and conceal the web portion 21 of the wheel body 15. The radial outer edge 33 of the cover member 12 is serrated (as shown in Figures 4 and 7), and is bent obliquely radially inwardly and axially forwardly into biting engagement with the depressed portions 24 of the wheel 10, the serrated portion of the cover member 33 lying opposite portions of the axially extending flange 20 which is not depressed but is cut away or bent back so as to leave the radial outer edge terminated in a straight edge which is seated on the corner of the base flange 16 with the intermediate side flange 17 of the rim 14 as is shown in the lower portion of Figure 2, as at 34. The radial inner edge or marginal portion 35 of the cover member 12 is arranged to be seated on and lie against the outermost portion of the body part 15 at substantially the junction of the web 21 with the shoulder 22.

The cover member 13 is shown as being in the form of a hub cap having a central dome-shaped portion 36 and an outer marginal portion which extends radially inwardly as at 37 and then axially rearwardly as at 38 and terminates in a tightly rolled edge 39. The tightly rolled edge of the axially rearwardly extending inclined portion 38 is arranged to be sprung over the protuberances 30 to retain the hub cap 13 in tight engagement on the wheel 10, by its own inherent resiliency. The radially inturned portion 37 of the hub cap 13 is arranged to be seated on the inner marginal portion 35 of the cover member 12.

In Figure 3 of the drawings, I have illustrated a modified form of the present invention, wherein the trim ring 11 is formed and shaped to have a plurality of attaching fingers 40 which extend axially rearwardly in telescopic sliding engagement with the base flange 16 of the rim 14 and which fingers 40 are terminated in tip portions 41 which extend obliquely radially inwardly and axially forwardly from the base flange 16 of the rim 14 into biting engagement with the deterrent portions 24 of the wheel body part 15. The outer marginal edge of the wheel cover member 12 is also provided with a plurality of fingers 42 which are arranged to make a telescopic sliding engagement with the axially rearwardly extending finger portions of the trim ring 11 and which are terminated in tip portions 43 which extend obliquely radially inwardly and axially forwardly from the finger portions 40 into biting engagement with the depressed portion 24 of the wheel body part 15. This nesting of the attaching means on the trim ring 11 and the attaching means on the cover member 12 in the space between the base flange 16 and the rim 14 and the depressed portion 24 of the wheel body part 15 provides a very secure and tight engagement of these two wheel cover members.

In Figures 4 to 7 inclusive I have illustrated the manner in which the novel construction disclosed in Figure 2 affords a marked reduction in the cost of manufacturing the wheel cover parts. From these figures it will be readily apparent that in providing a construction such as that shown in Figure 2 a highly efficient and rugged wheel cover structure is provided which may be readily and easily applied to the wheel structure and also that due to the particular construction shown in Figure 2, the wheel cover parts may be manufactured by the use of a minimum of material, thus greatly reducing the cost of the completed article.

All three of the cover members 11, 12 and 13 are blanked from a single piece of thin sheet metal stock 44. A saw-tooth line of cut 45 is provided between the cover member 11 and the cover member 12 thereby to provide the serrated edges 32 and 33 respectively. By thus severing the members 11 and 12 along a saw-tooth line of cut 45, which single line of cut provides both the serrations or teeth of the member 11 as well as of member 12, a very economical manufacturing process is provided, and permits the use of a square sheet of metal stock 44 which is smaller in over-all dimensions than would otherwise be necessitated. The cover member 12 is separated from the blank 44 along its inner edge by a line of cut 46. The hub cap 13 is separated from the blank 44 by a line of cut spaced radially inwardly of the line of cut 46. The annulus lying between these lines of cut (Figure 5) may be used to form a beading or other decorative article for any suitable purpose.

In Figure 5 of the drawings I have shown how the uncut sheet metal blank 44 may be first stamped or drawn before the cover members 11, 12 and 13 are separated from each other, thereby greatly reducing the necessary handling of the parts and permitting the stamping or pressing to be accomplished with a minimum of time and labor. In this connection, it will be noted that the cover members 11 and 12 are given substantially their final shape or configuration while the central dome-shaped portion 36 of the hub cap is given its final configuration in its first stamping or drawing step, but the remaining portion of the hub cap 13 is left in the substantially cylindrical portion 47 which connects with the cover member 12. After the hub cap portion has been severed and separated from the stamped or drawn blank, as shown in Figure 5, the cylindrical portion 47 is collapsed or sprung to provide the radially inwardly extending portion 37 and the axially rearwardly extending fastening flange 38.

After the trim ring portion 11 and the cover member 12 have been separated from the stamped or drawn blank, as shown in Figure 5, they are in the form as shown by the full lines in Figure 6, while the serrated or saw-tooth edge 32 is bent into the shape as shown by the dotted line in Figure 6. Similarly, the radial outer edge 33 of the cover member 12 is bent to the shape as shown by the dotted line in Figure 6. However, prior to the bending of this radially outer edge 33 into the shape as shown by the dotted line in Figure 6, the teeth 48 which would otherwise be opposite portions of the wheel body flange 20 which is not depressed inwardly as at 24 in Figure 2, are cut off of the flange which forms the cover member 12, as shown in Figure 7. If desired, they may be bent back instead of being cut off. The remaining teeth 49 are then bent into shape as shown by the dotted line in Figure 6 to form the attaching edge portion 33 as shown in Figure 2.

It is to be understood that the embodiment shown herein is for illustrative purposes and may be changed or modified without departing from the spirit and scope of the invention as set forth in the appended claims.

I claim as my invention:

1. The combination comprising a wheel having radially facing shoulder portions thereon, a cover member having substantially axially rearwardly extending fastening means which telescope within said shoulder portions and being seated thereon, and a second cover member having substantially axially rearwardly extending fastening means thereon which telescope within said axially rearwardly extending means of said first member, and means for securing said members to said wheel.

2. The combination comprising a wheel having radially facing shoulder portions thereon, a cover member having substantially axially rearwardly extending fastening means which telescope within said shoulder portions and being seated thereon, and a second cover member having substantially axially rearwardly extending fastening means thereon which telescope within said axially rearwardly extending means of said first member, each of said axially rearwardly extending means of said first and second members being independently secured to said wheel.

3. In a wheel assembly including a wheel having rim and body parts, said rim part including a base flange and said body part including a rearwardly extending flange upon which said base flange is seated and secured, circumferentially spaced portions of said rearwardly extending flange being depressed radially inwardly forming spaced opposed faces on said flanges, a trim ring for disposition on said wheel having a plurality of integral fingers which extend axially rearwardly from the inner edge thereof in telescoping relation with the base flange of said rim and then obliquely radially inwardly and axially forwardly into biting engagement with said depressed portions of said rearwardly extending flange, and a cover member for disposition on said wheel having a plurality of integral fingers on the radial outer margin thereof which telescope within said fingers on said trim ring and are seated thereon, said fingers of said cover member having their tip portions bent to extend obliquely radially inwardly and axially forwardly from said fingers on said trim ring into biting engagement with said depressed portions of said rearwardly extending flange.

4. In a wheel structure having a tire rim including a radially outer edge portion and having a body part including a radially outer annular portion and a central vehicle attachment portion, there being spaced apertures at the junction of the rim and radially outer annular portion, a cover assembly including a central part arranged to overlie the outer side of the vehicle attachment portion, and a radially outwardly disposed annular part arranged to overlie the outer side of the radially outer annular portion of the body part and to conceal said spaced apertures, concealed retaining fingers on the cover assembly for retainingly engaging in said spaced apertures behind the outer cover part, said central cover part being arranged to overlie the radially inner margin of the outer annular part of the cover to secure the same against the adjacent portion of the outer surface of the wheel.

5. The combination comprising a wheel having radially facing shoulder means thereon, a resilient first cover member having substantially axially rearwardly extending fastening means which telescope within said shoulder means and being seated thereon, and a second cover member having substantially axially rearwardly extending fastening means thereon which telescope within said axially rearwardly extending means of said first member to press the same resiliently radially into conformity with the shoulder means against which said axially rearwardly extending means of said first member is disposed, and means for securing said second cover member to said wheel.

GEORGE ALBERT LYON.